United States Patent
Karthik et al.

(10) Patent No.: US 10,861,359 B2
(45) Date of Patent: Dec. 8, 2020

(54) SURROUND-VIEW WITH SEAMLESS TRANSITION TO 3D VIEW SYSTEM AND METHOD

(71) Applicant: TEXAS INSTRUMENTS INCORPORATED, Dallas, TX (US)

(72) Inventors: Shravan Karthik, Bangalore (IN); Srirama Krishnan Govindarajan, Bangalore (IN); Venkateswara Rao Mandela, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 64 days.

(21) Appl. No.: 15/706,345

(22) Filed: Sep. 15, 2017

(65) Prior Publication Data
US 2018/0336806 A1 Nov. 22, 2018

(30) Foreign Application Priority Data
May 16, 2017 (IN) .............................. 201741017062

(51) Int. Cl.
| | | |
|---|---|---|
| G09G 3/00 | (2006.01) | |
| G06T 3/00 | (2006.01) | |
| H04N 5/232 | (2006.01) | |
| H04N 13/293 | (2018.01) | |
| H04N 13/361 | (2018.01) | |

(52) U.S. Cl.
CPC .......... *G09G 3/001* (2013.01); *G06T 3/0062* (2013.01); *G09G 3/003* (2013.01); *H04N 5/23238* (2013.01); *H04N 13/293* (2018.05); *H04N 13/361* (2018.05); *B60R 2300/105* (2013.01)

(58) Field of Classification Search
None
See application file for complete search history.

(56) References Cited

U.S. PATENT DOCUMENTS

| | | | |
|---|---|---|---|
| 7,145,519 B2 | 12/2006 | Takahashi et al. | |
| 2001/0004266 A1* | 6/2001 | Itsukaichi | H04N 5/232 348/220.1 |
| 2010/0225644 A1 | 9/2010 | Swope, III et al. | |

(Continued)

OTHER PUBLICATIONS

Author unknown, "Early Boot and Late Attach in QNX", published by Texas Instruments, archived from http://processors.wiki.ti.com/index.php/Early_Boot_and_Late_Attach_in_QNX#Introduction on Oct. 12, 2015.*

(Continued)

*Primary Examiner* — Zhengxi Liu
(74) *Attorney, Agent, or Firm* — Brian D. Graham; Charles A. Brill; Frank D. Cimino (57) ABSTRACT

A method for seamless transition from a 2D surround view to a 3D surround view. The method includes initializing the 2D-SRV processing chain, displaying the 2D surround view while waiting for HLOS handshake to complete and upon completion of a HLOS handshake, initializing a 3D-SRV processing chain and waiting for a 3D-SRV buffer output; disabling the 2D-SRV display pipeline and enabling a 3D-SRV display pipeline; enabling switchback monitor; atomically switching to 3D surround view seamlessly and glitch free; and displaying 3D surround view on a monitor. Another method includes detecting a crash in a HLOS and seamlessly switching to a 2D surround view from a 3D surround view.

20 Claims, 9 Drawing Sheets

(56) References Cited

U.S. PATENT DOCUMENTS

| | | | |
|---|---|---|---|
| 2011/0156887 A1 | 6/2011 | Shen et al. | |
| 2013/0143489 A1* | 6/2013 | Morris | H04B 5/0056 |
| | | | 455/41.1 |
| 2013/0182066 A1 | 7/2013 | Ishimoto | |
| 2014/0002451 A1* | 1/2014 | Hoerentrup | G11B 27/322 |
| | | | 345/419 |
| 2015/0269737 A1* | 9/2015 | Lam | H04N 13/128 |
| | | | 382/154 |
| 2016/0027141 A1* | 1/2016 | Patel | G06T 1/20 |
| | | | 345/522 |
| 2017/0193693 A1* | 7/2017 | Robert | G06T 7/55 |
| 2017/0195564 A1* | 7/2017 | Appia | H04N 5/23238 |
| 2017/0361808 A1* | 12/2017 | Haga | B60R 25/307 |
| 2018/0005444 A1* | 1/2018 | Mullins | G06T 19/006 |

OTHER PUBLICATIONS

Appia et al., "Surround view camera system for ADAS on TI's TDAx SoCs", published by Texas Instruments in 2015.*
International Search Report and Written Opinion dated Sep. 20, 2018, International Application No. PCT/US2018/033030, 6 pages.

* cited by examiner

SURROUND-VIEW WITH SEAMLESS TRANSITION TO 3D VIEW SYSTEM AND METHOD

CROSS REFERENCE TO RELATED APPLICATIONS

This application claims the benefit of Provisional Application No. 201741017062, filed in India on May 16, 2017, the disclosure of which is fully incorporated herein by reference.

BACKGROUND OF THE INVENTION

Technical Field

The present invention relates to a fail-safe surround-view system with seamless transition to 3D view in an automotive, ADAS, or infotainment system. Specifically, the present invention relates to seamless transition from a 2D surround view to a 3D surround view upon boot up and a seamless transition from a 3D surround view to a 2D surround view upon detection of failure.

Description of Related Art 3 dimensional surround view (3D-SRV) systems generally use a graphical processing unit (GPU) which is managed by a high level operating system (HLOS). In an infotainment system, HLOS can crash due to software vulnerabilities. In an event of HLOS crash, the 3D-SRV display freezes, which can lead to safety hazard if this happens while the driver is maneuvering the car using the visual output from the real-time display. Therefore, there is a need to seamlessly transition to a 2D surround view or another view when a failure is detected and the display freezes or glitches.

Figure 1:
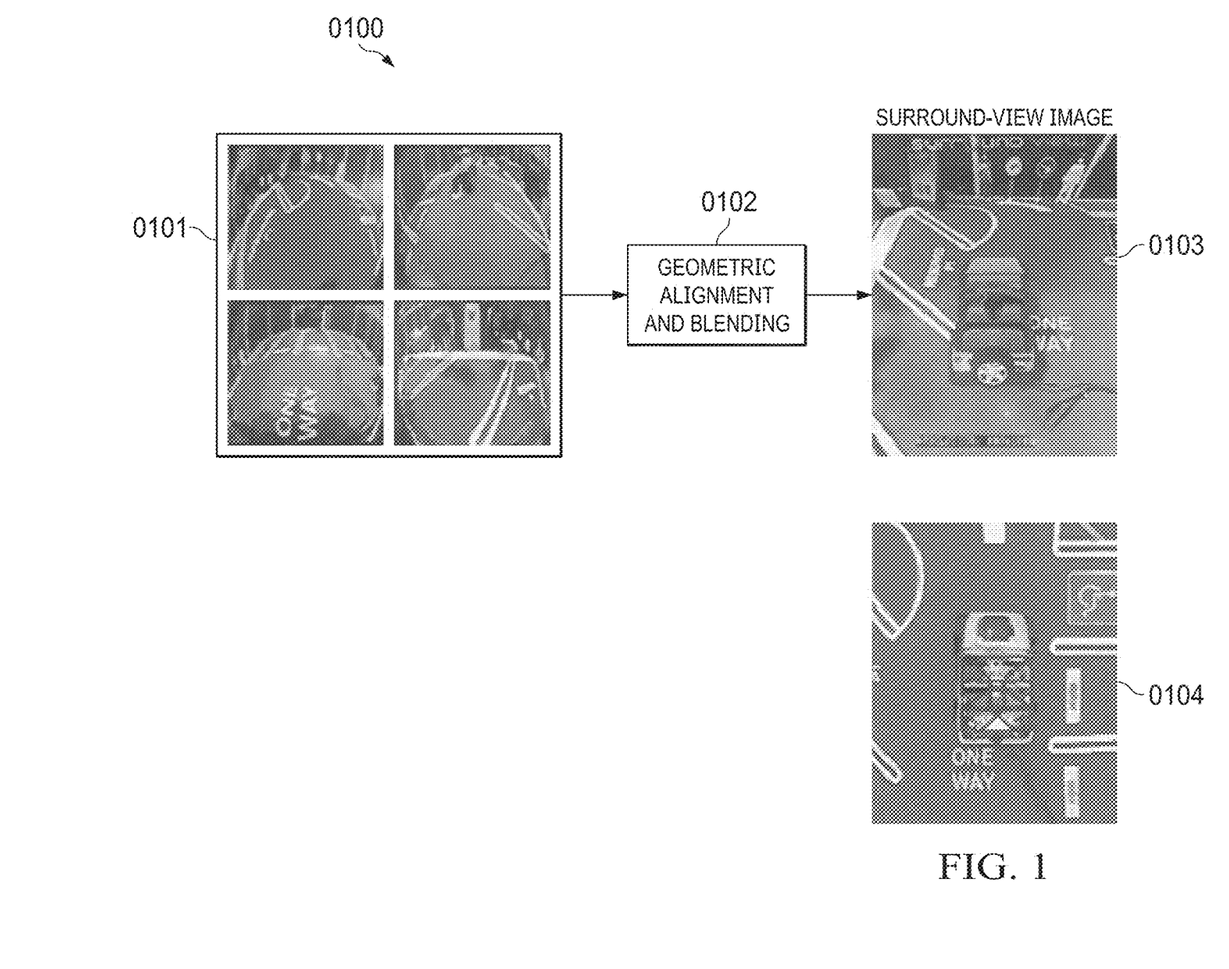
FIG. 1 illustrates a prior art input frame geometrically converted to an output 3D frame and an output 2D frame.

Surround-view (SRV) is stitching a panoramic view of an object by blending field of view along multiple orientations. Video captured along 4 directions processed through multiple algorithms namely, geometric alignment, photometric alignment, and blending to generate a panoramic view. SRV is broadly classified into a 2D-SRV birds-eye view of an object as seen overhead and a 3D-SRV panoramic view along different viewports. FIG. 1 (0100) generally illustrates a prior art 3D SRV (0103) and a 2D SRV (0104) of an image displayed on a screen. The input image (0101) may be captured by multiple cameras and a geometric correction engine (0102) may correct, align and blend the images into a 3D SRV or a 2D SRV.

Figure 2:
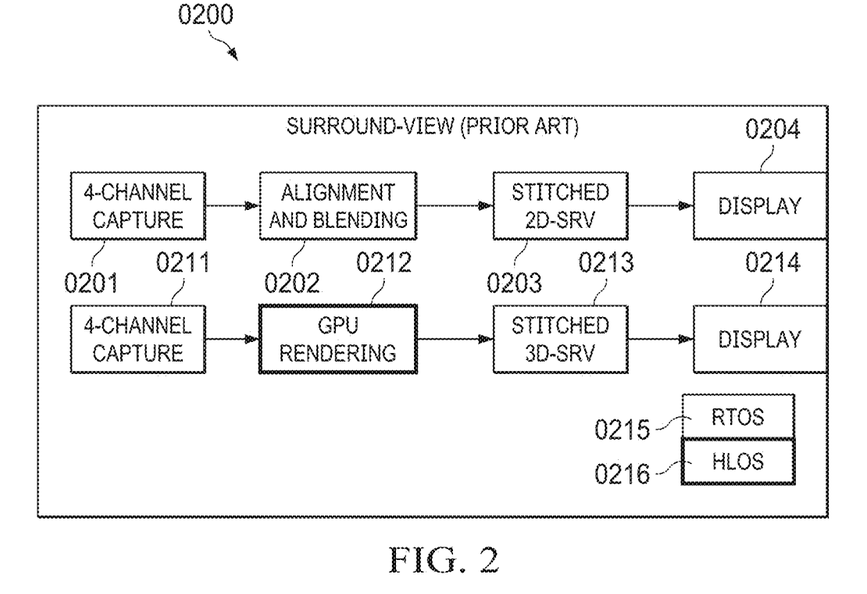
FIG. 2 illustrates a prior art surround view processing method.

FIG. 2 generally illustrates a prior art block diagram of a 3D SRV processing engine and a 2D SRV processing engine of an image. The 2D processing engine includes a channel capture block (0201), an alignment and blending block (0202), a stitching block (0203), and a display block (0204). The 3D SRV processing engine includes a channel capture block (0211), a graphical processing unit (GPU) rendering block (0212), a stitching block (0213), and a display block (0214). The 2D SRV processing engine and the 3D SRV processing engine may be run in conjunction with a high level operating system (HLOS) (0216) and a real time operating system (RTOS) (0215). Prior art systems implement either the 2D processing engine or the 3D processing engine. Therefore, when a system implements a 2D processing engine, and if the images on the display block (0204) freezes, there is no ability to seamlessly switch over to a 3D processing engine. Alternatively, when a system implements a 3D processing engine, and if the images on the display block (0214) freezes, there is no ability to seamlessly switch over to a 2D processing engine. The failure to switch between the 2D processing engine and the 3D processing engine can lead to safety hazard while the driver is maneuvering the car using the visual output from the real-time display. Therefore, there is a need to implement and run both the 2D processing engine and the 3D processing engine in parallel or otherwise such that there is a seamless switching between the engines while alleviating the safety hazards especially in an automobile. There is a need for a fault tolerant system that provides a user with a birds-eye view of the surroundings if a 3D SRV processing engine crashes. Prior art devices running 3D-SRV applications do not teach a fail-safe redundancy to fall back on in case of HLOS crash, the entire board has to be rebooted.

SUMMARY OF THE INVENTION

The present invention is a method for seamless transition from a 2D surround view to a 3D surround view. The method includes initializing the 2D-SRV processing chain, displaying the 2D surround view while waiting for HLOS handshake to complete and upon completion of a HLOS handshake, initializing a 3D-SRV processing chain and waiting for a 3D-SRV buffer output; disabling the 2D-SRV display pipeline and enabling a 3D-SRV display pipeline; enabling switchback monitor; atomically switching to 3D surround view seamlessly and glitch free; and displaying 3D surround view on a monitor. Another method includes detecting a crash in a HLOS and seamlessly switching to a 2D surround view from a 3D surround view

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE INVENTION

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a seamless and glitch free transition from a 2D surround view to a 3D surround view. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

It should be noted that the terms "3D-SRV", "3D SRV", "3D surround view", "3D view" are interchangeably used herein after to define a 3 dimensional view surrounding an object or place. Similarly, "2D-SRV", "2D SRV", "2D surround view", "2D view" are interchangeably used herein after to define a 2 dimensional birds-eye view surrounding an object or place. It should be noted that the terms "output image" and "output frame" are interchangeably used herein after to indicate an image displayed on a screen. It should be noted that the terms "input image" and "input frame" are interchangeably used herein after to indicate an image captured by a camera.

Figure 3:
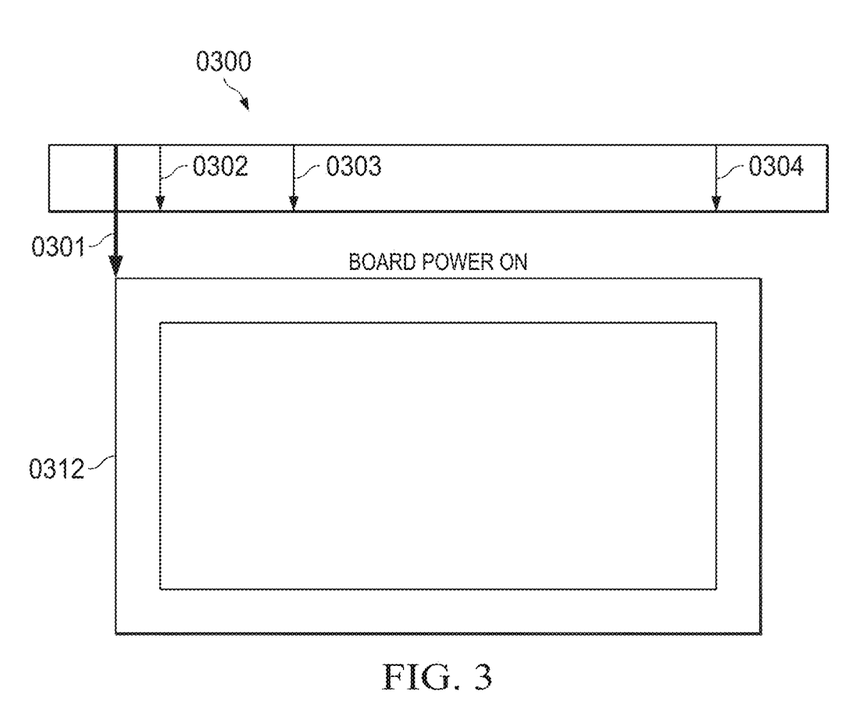
FIG. 3 depicts an exemplary screen shot of a boot up routine according to one aspect of the present invention.
Figure 4:
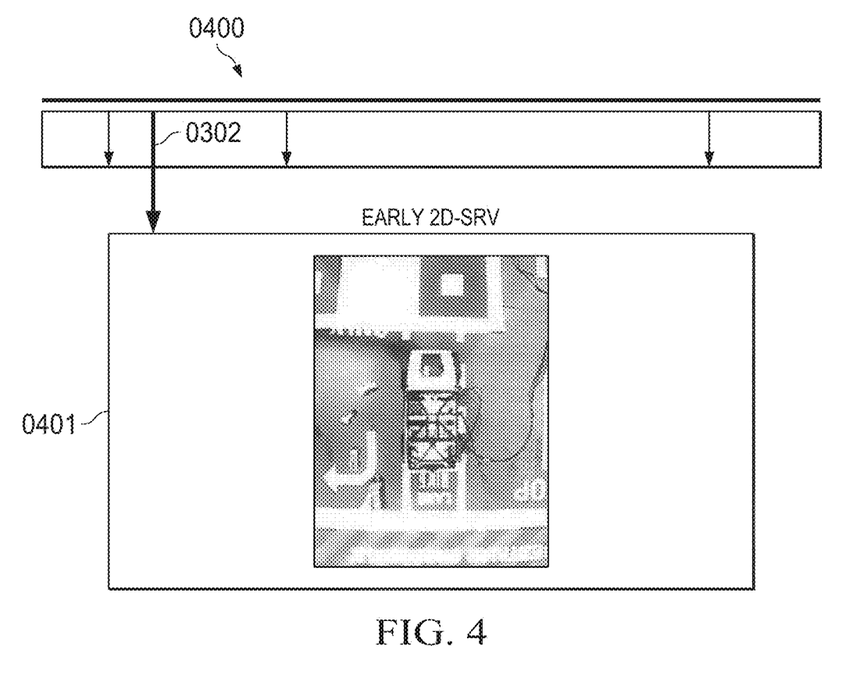
FIG. 4 depicts an exemplary screen shot of a 2D surround view after the boot up illustrated in FIG. 3, according to one aspect of the present invention.
Figure 5:
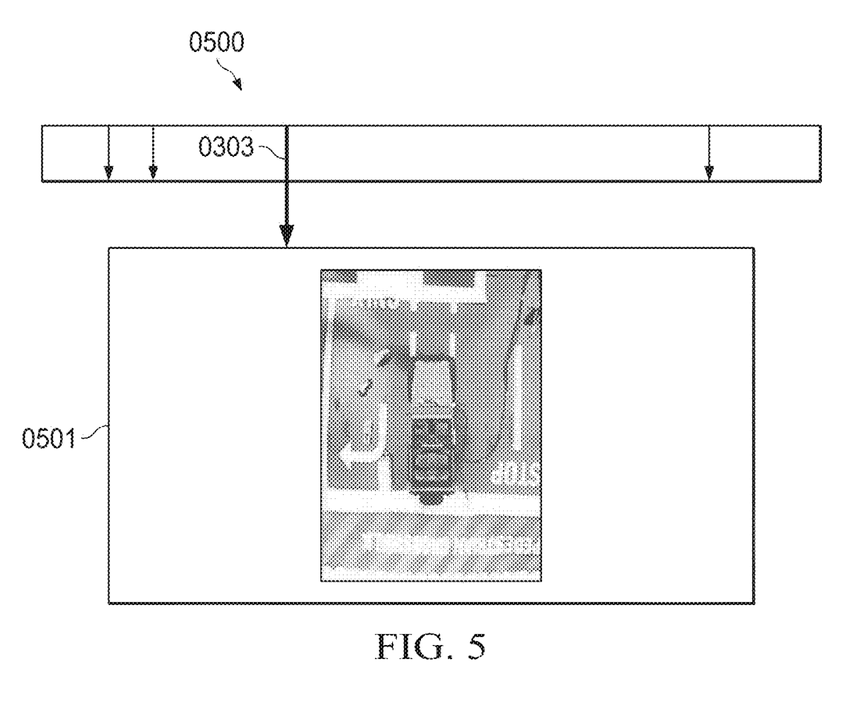
FIG. 5 depicts an exemplary screen shot of a seamless switch to a 3D surround view from the 2D surround view of FIG. 4, according to one aspect of the present invention.
Figure 6:
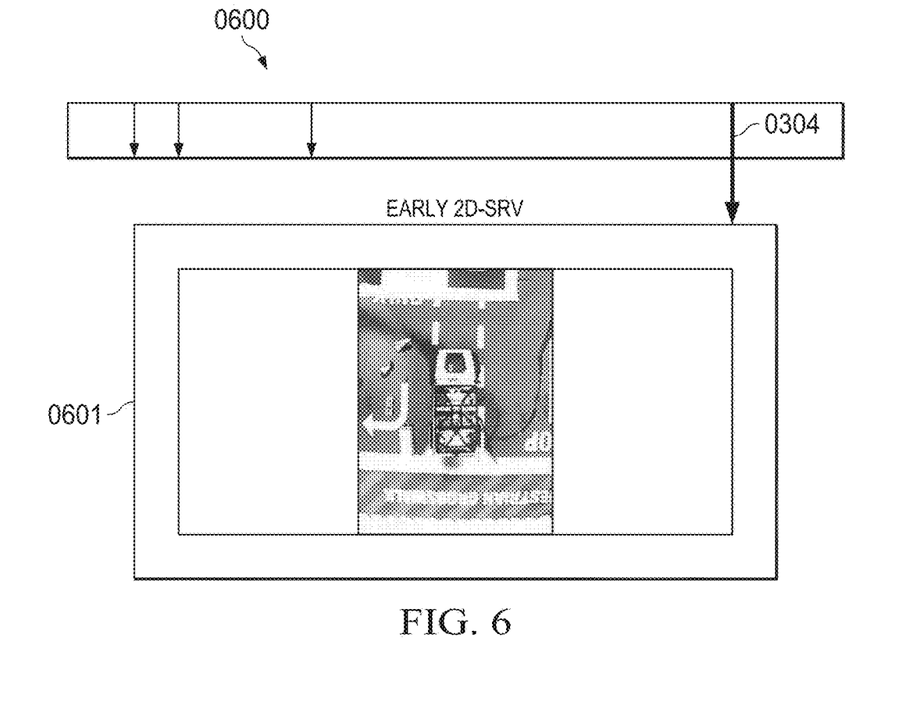
FIG. 6 depicts an exemplary screen shot of a seamless switch to a 2D surround view from the 3D surround view of FIG. 4 after detecting a failure, according to one aspect of the present invention.

FIG. 3 depicts an exemplary screen shot of a boot up routine according to one a preferred exemplary embodiment. The screen shot (0300) illustrates a time line of events (0301, 0302, 0303, and 0304) generated with an exemplary apparatus (0312). Upon powering up and booting at time (0301), a processor may execute a boot code and initialize the view ports of cameras and other parameters such as the pointers to load a HLOS. FIG. 4 (0400) depicts an exemplary screen shot of a 2D surround view after the boot up illustrated in FIG. 3, according to a preferred embodiment. At time (0302), a 2D SRV may be displayed on a screen (0401) showing a birds-eye view of the surroundings. FIG. 5 (0500) depicts an exemplary screen shot of a seamless switch to a 3D surround view from the 2D surround view of FIG. 4, according to a preferred embodiment. At time (0303), when the 3D surround processing engine and 3D pipeline display is enabled, the display seamlessly switches from the 2D SRV view to a 3D SRV view without glitch. FIG. 6 (0600) depicts an exemplary screen shot of a seamless switch to a 2D surround view from the 3D surround view of FIG. 4 after detecting a failure, according to an exemplary embodiment. At time (0304), when any failure is detected in the 3D SRV engine or the 3D SRV pipeline display, the exemplary apparatus (0700) seamlessly switches the image on a user display to a 2D SRV view.

Figure 7:
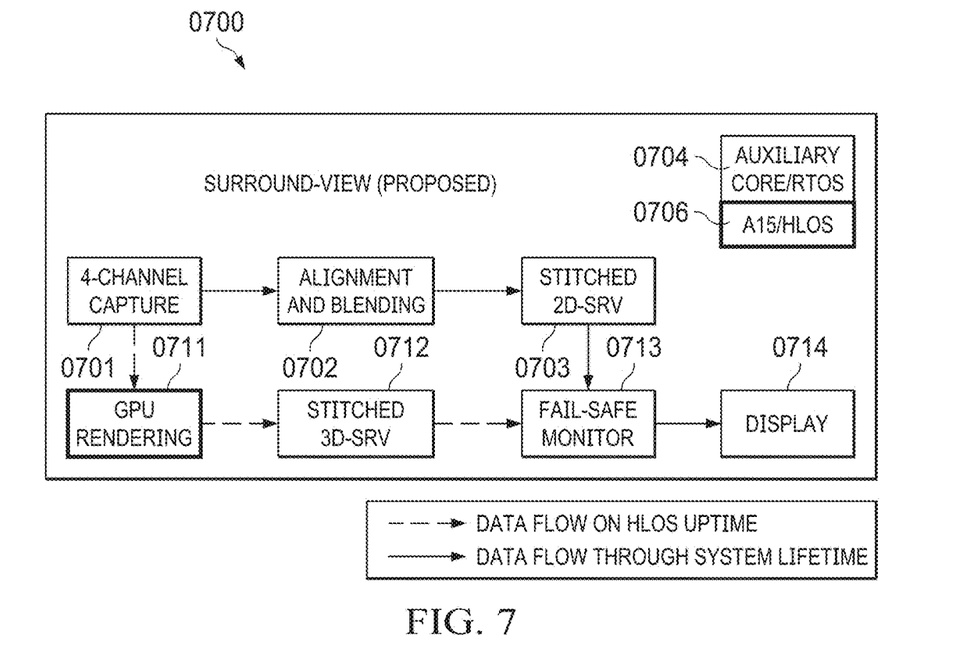
FIG. 7 depicts an exemplary apparatus of simultaneous processing of an input image with a 2D-SRV processing chain and a 3D-SRV processing chain according to one aspect of the present invention.

FIG. 7 depicts an exemplary apparatus and data flow of simultaneous processing of an input image with a 2D-SRV processing chain and a 3D-SRV processing chain according to a preferred embodiment. The apparatus (0700) comprises a channel capture block (0701), an alignment and blending block (0702), a 2D stitching block (0703), a GPU rendering block (0711), a 3D stitching block (0712), a fail-safe monitor (0713), and a display block (0714). The channel capture block (0701) may capture images from one or more cameras. A RTOS (0704) running on an auxiliary core or processor (not shown) may control the flow of information between the blocks except the GPU rendering block (0711). A HLOS (0706) such as Linux operating system may be running on an embedded processor (not shown) and when the HLOS is initialized, loaded and ready, images may be processed through the GPU rendering block (0711). The RTOS (0704) and the HLOS (0706) may perform a hand shake protocol to enable processing of images captured for 3D SRV. The cameras may be mounted on an automobile at different positions, for example left, right, center, and rear. The cameras may also have different field of view or view angle. The number of cameras may range from 1 to 20 and more preferably 1 to 4. The number of images captured by the cameras may range from 1 to 20 and more preferably 1 to 4. Upon capturing the images, the channel capture block (0701) may forward the images with minimal processing to an alignment and blending block (0702) and to a GPU rendering block (0711). The images may be aligned and blended into one image after further processing in the alignment and blending block (0702). Each of the images may be transformed, mapped backward or forward, geometrically corrected for distortions, and blended into output images which are forwarded to a 2D-stiching block (0703). The output images processed from the input images may be stitched into one 2D SRV output image and passed through a failsafe monitor (0713) for display on a display device (0714). The 2D SRV image is always available for display on the display screen as long as the auxiliary core and the RTOS are running. RTOS is susceptible to crashes and are often certified to be fault-tolerant. But the auxiliary cores may be running as long as the board is powered on. Therefore, according to an embodiment the 2D-SRV buffers are always available for display. Any available industry standard may be chosen for the pixel format of the input images and the output images. After a handshake between the RTOS and the HLOS, a 3D SRV processing engine may be initialized and when the GPU is ready, the input images captured by the capture block may be processed through a GPU rendering unit (0711). The processed input images may then be stitched into a 3D SRV image in a 3D SRV stitching block (0712). The 3D SRV image from the 3D stitching block flows through a failsafe monitor (0713) and then displayed on a display device (0714) when the 3D pipeline display is enabled by the HLOS. The failsafe monitor is continuously running on the auxiliary core and receives input from both the 2D stitching block and the 3D stitching block. According to a preferred exemplary embodiment, the display of the output image seamlessly switches from a 2D SRV to a 3D SRV after the 3D SRV is initialized and ready for display. According to another preferred exemplary embodiment, upon detecting a failure in the failsafe monitor (0713), the display of the output image seamlessly switches to a 2D SRV. According to yet another exemplary embodiment, the input images are processed through the 2D SRV processing engine and the 3D SRV processing engine simultaneously. The failsafe monitor may monitor for errors as described below in FIG. 8*b* (0810).

Figure 8A:
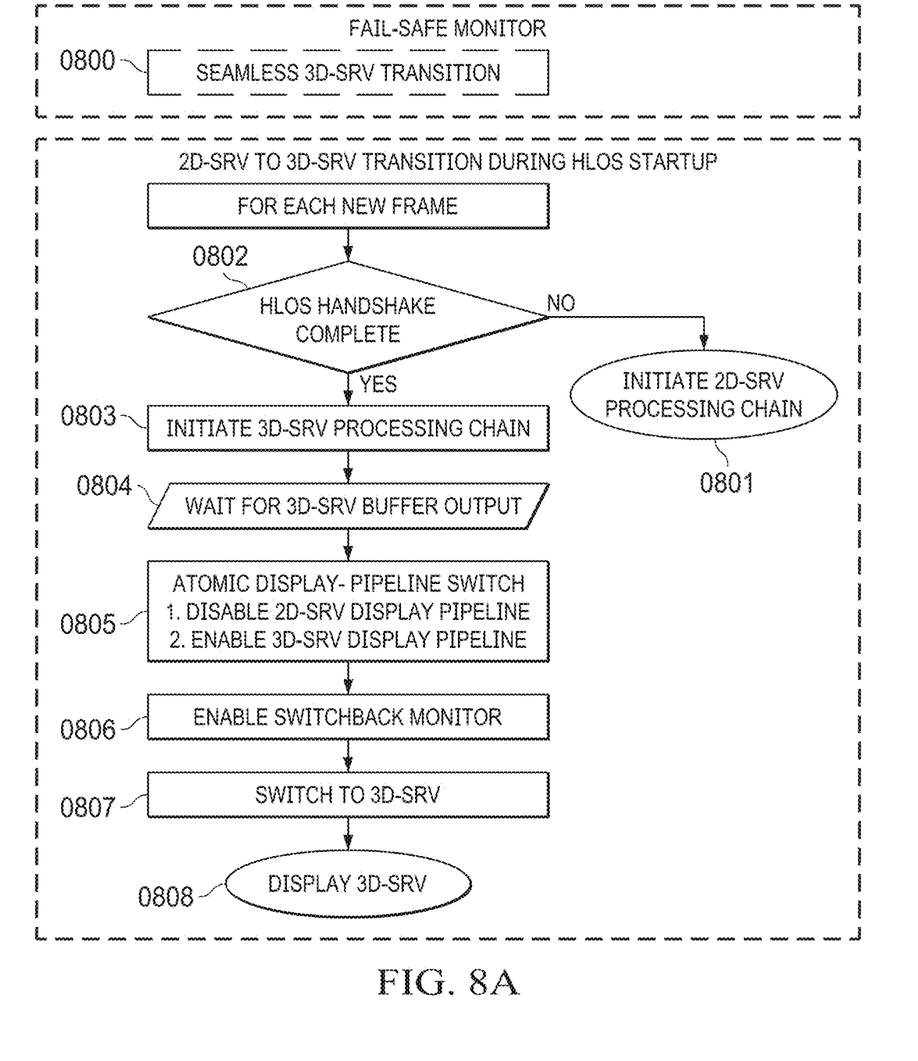
FIG. 8a depicts an exemplary seamless transition method from a 2D surround view display to a 3D surround view display according to one aspect of the present invention.

As generally seen in the flow chart of FIG. 8*a* (0800), a preferred exemplary method for exemplary seamless transition method from a 2D surround view display to a 3D surround view may be generally described in terms of the following steps:

1. initializing a 2D-SRV processing chain and displaying a 2D surround view (0801);
    This step further comprises booting from a boot loader and enabling 2D-SRV display pipeline. The 2D-SRV display pipeline may be automatically enabled by default. The time for booting ranges from 1 millisecond to 10 milliseconds. The boot-time for the 2D-SRV application (time from powering on the board) can range between 300 ms to 10 s depending on the number of cameras and the sensors being used.
2. displaying the 2D surround view while waiting for HLOS handshake to complete (0802);
    The steps of displaying the 2D surround view as described in FIG. 7 may generally be described in terms of the following steps:
      a. capturing one or more input images with at least one optical device;
      b. aligning and blending the input images;
      c. stitching the images into one output image;
      d. checking if 2D-SRV display pipeline is enabled; and
      e. displaying the 2D surround view.
    The step of waiting for the HLOS hand shake as described in the timing flow chart of FIG. 10 may generally be described in terms of the following steps:
      a. initializing a GPU;
      b. checking if HLOS is ready; and (Initialization of GPU happens only when HLOS is ready, thus points a) and b) have to be swapped)
      c. checking if GPU is ready to render the 3D surround view.
3. if HLOS handshake complete, initializing 3D-SRV processing chain, if not, proceeding to step (0802) (0803);
    According to a preferred exemplary embodiment, the 2D processing chain and the 3D processing chain are both running simultaneously and in parallel when the 3D-SRV processing chain is initialized and enabled. The simultaneous presentation of the input images to both 3D SRV processing engine and the 2D SRV processing engine enables a system to switch from 2D SRV view to 3D SRV view; and when a failure is detected, a switch back from 3D SRV view to a 2D SRV view.
4. waiting for a 3D-SRV buffer output (0804);
    When the 3D SRV processing engine is initialized and enabled, input frames may be passed to a 3D-SRV buffer which allows the input frames to flow to a GPU block.
5. disabling 2D-SRV display pipeline and enabling 3D-SRV display pipeline (0805); A register bit in a register map may be written to 1 or 0 and the 2D-SRV display pipeline may be disabled. Similarly, a register bit in a register map may be written to 1 or 0 and the 3D-SRV display pipeline may be enabled. The register map may be maintained in an internal memory with predefined addressing locations.
6. enabling switchback monitor (0806);
7. atomically switching to 3D surround view (0807); and
    According to an exemplary embodiment a latency of atomically switching the display between the 2D surround view and the 3D surround view is substantially 0. According to a more preferred exemplary embodiment, a latency of atomically switching the display between the 2D surround view and the 3D surround view 30 milliseconds to 1 minute 30 seconds. The latency may range between 30 ms to 500 ms if the display is refreshed at 30 frames per second (FPS) and the latency can vary between 15 ms to 250 ms if the display is refreshed at 60 FPS. According to yet another exemplary embodiment, a latency of atomically switching the display between the 2D surround view and the 3D surround view happens without loss of an input frame.
8. displaying 3D surround view on a monitor (0808).
    The method of displaying a 3D surround view as described in FIG. 7 may generally be described in terms of the following steps:
      a. capturing one or more input images with at least one optical device;
      b. processing though a GPU rendering block;
      c. stitching the images into one output image;
      d. checking if 3D-SRV display pipeline is enabled; and
      e. displaying the 3D surround view.

According to a preferred exemplary embodiment, input images are captured through a view port and presented to the 2D processing chain and the 3D processing chain concurrently. A state machine may be implemented to keep track of the state of the processing and display. The state machine may be implemented in a system on a chip (SOC) to keep track of the state of the display engine and counters. Each of the method steps may correspond to a state of the processing. A present state and a next state variable may be implemented so that the state machine transitions from a present state to next state on each clock cycle based on predetermined trigger conditions such as errors, switching between 3D and 2D, enabling and disabling display pipelines, etc. The failsafe monitor may be a state machine that is triggered by events. These event currently includes availability of 3D-SRV buffers, which triggers the change of state to enabling/disabling pipelines and buffer management (determine if the captured buffers are to be shared with the 3D-SRV processing chain).

Figure 8B:
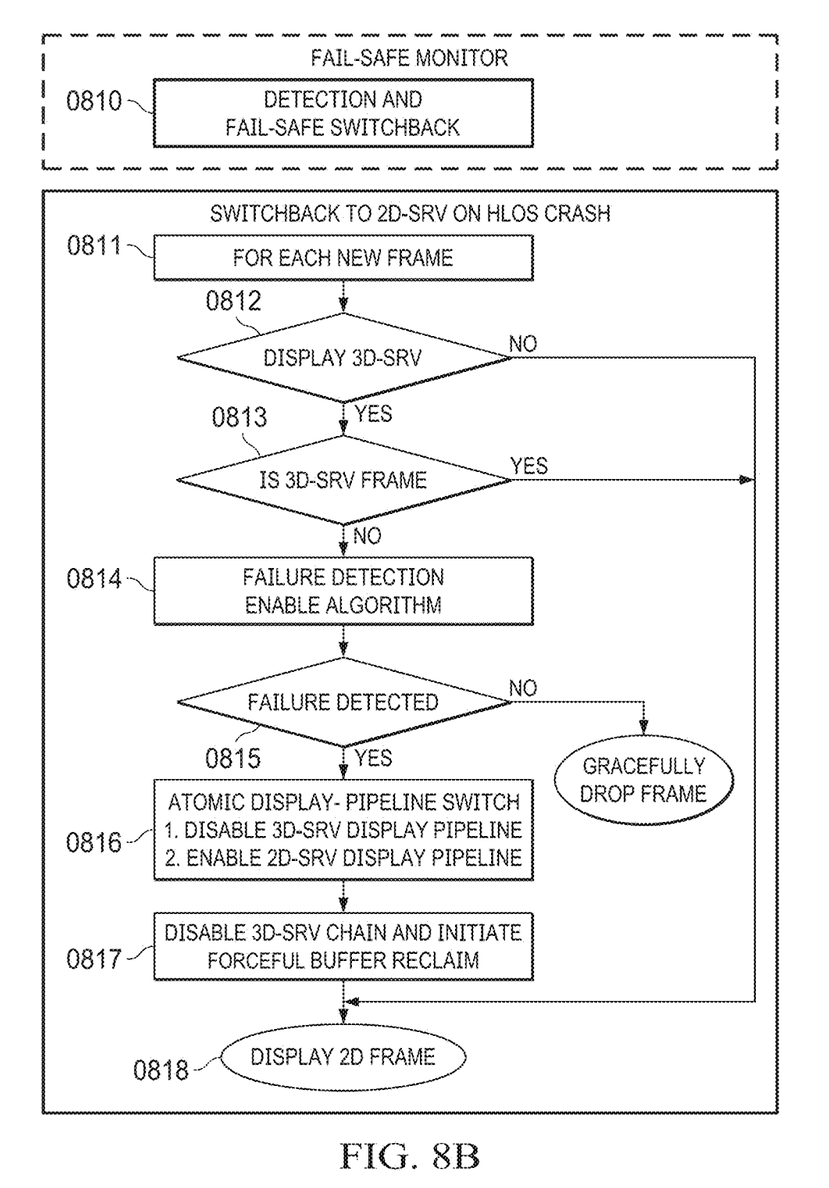
FIG. 8b depicts an exemplary failsafe method for transitioning from a 3D surround view display to a 2D surround view display upon detection of a failure according to one aspect of the present invention.
Figure 11:
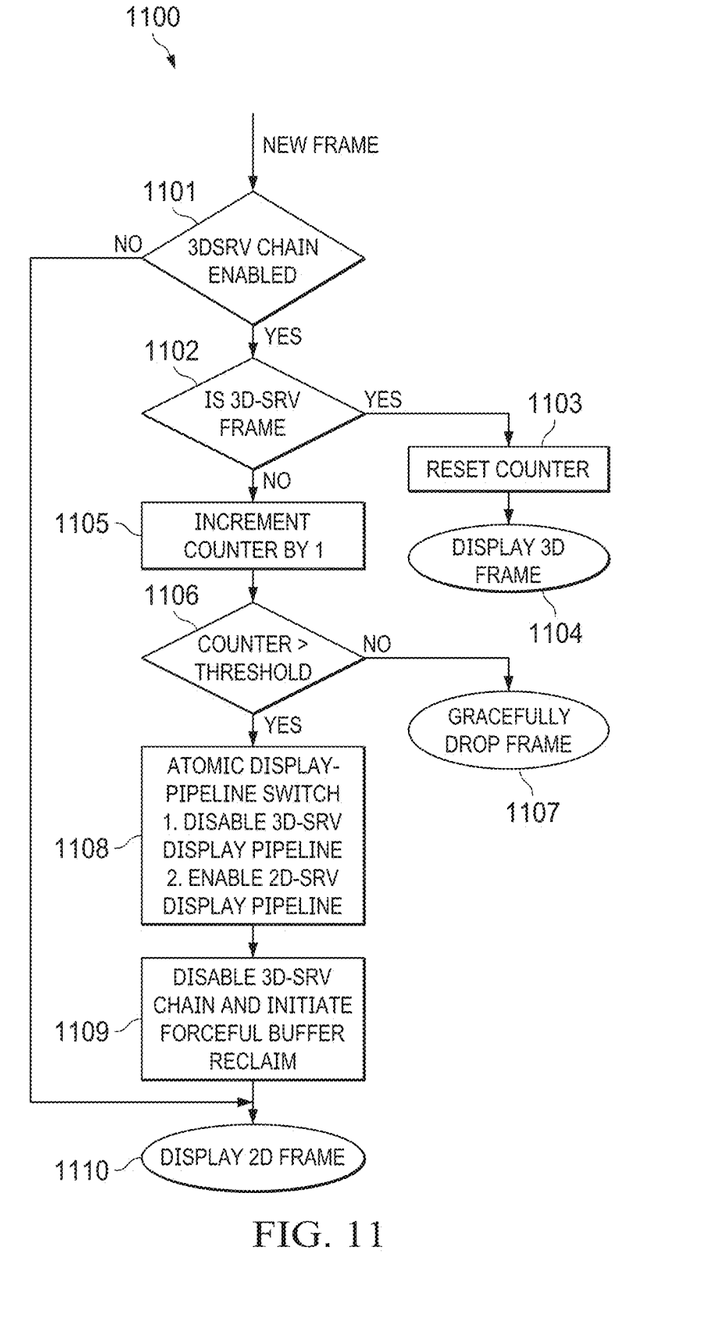
FIG. 11 is an exemplary flowchart of a failure detection method according to one aspect of the present invention.

As generally seen in the flow chart of FIG. 8*b* (0810), a preferred exemplary failsafe method for transitioning from a 3D surround view display to a 2D surround view display upon detection of a failure may be generally described in terms of the following steps:

1. capturing a new frame (0811);
2. displaying the 3D surround view, if 3D processing chain enabled, if not displaying the 2D surround view in step (0818) (0812);
3. if 3D surround view enabled, checking if type of the new frame is a 3D frame, if so, enabling failure detection algorithm in step (0814) and displaying 3D SRV, if not, enabling failure detection algorithm in step (0814) and checking if a failure detected in step (0815) (0813);
4. enabling failure detection algorithm (0814);
5. if failure detected, proceed to step (0816), if not, gracefully dropping the frame (0815);

The method of detecting a failure as shown in FIG. 11 may be generally described in terms of the following steps:
   a. capturing a new frame;
   b. if the captured frame is not a 3D type frame, incrementing a lag counter by 1, if not, resetting the lag counter; and
   c. checking if the lag counter exceeds a threshold value, if so, detecting a failure.
6. atomically switching to the 2D surround view, disabling 3D-SRV display pipeline and enabling 2D-SRV display pipeline (0816);
7. disabling 3D processing chain and enabling forceful buffer reclaim (0817); and Buffers used to store the input frames by HLOS may not be released when a failure is detected and the HLOS is crashed. According to an exemplary embodiment, the buffers are forcefully reclaimed so that frames are not dropped. A book keeping mechanism may be utilized to keep track of buffers (input frames) that are shared with the core running HLOS. The book keeping mechanism may comprise a buffer address that is queued to pending buffer list before forwarding to GPU for rendering. If a buffer returned by the GPU due to a failure, the buffer address corresponding to the buffer may be de-queued. Upon a HLOS crash, all buffers in the pending buffer list are forcefully cleared until the list is empty. Forceful buffer reclaim ensures that the performance of the system is not degraded. For example, displaying images or frames at 30 frames per second (FPS) may require a buffer reclaim. When a buffer reclaim is not enabled, the performance may drop to 15 FPS. HLOS and RTOS may share a common resource like the captured video buffers, and upon HLOS crash buffers held by HLOS aren't released thereby they can't be reused to capture video output. This may lead to a bottle-neck at the capture source which has limited buffers available to write into. Depending on the latency of detection of HLOS failure, the number of captured buffers held by the HLOS can vary. Higher the latency, greater the number of buffers being held by the HLOS, subsequently fewer buffers are available at the capture source. Thus, when the system switches back to 2D-SRV after a crash detection, the frame rate drops significantly, as the capture source cannot write to a buffer unless the 2D-SRV processing chain has returned back its buffer. The frame rates can drop to 5-10 FPS if the latency of HLOS failure detection is high and no buffer reclaim is being implemented. If buffer reclaim is implemented the frame rate may be constant (30 FPS/60 FPS) as all buffers are available for the capture source to write into.
   The switching to a 2D SRV view happens seamlessly without dropping a frame and without losing performance.
8. displaying the 2D surround view on a monitor (0818).

Figure 9:
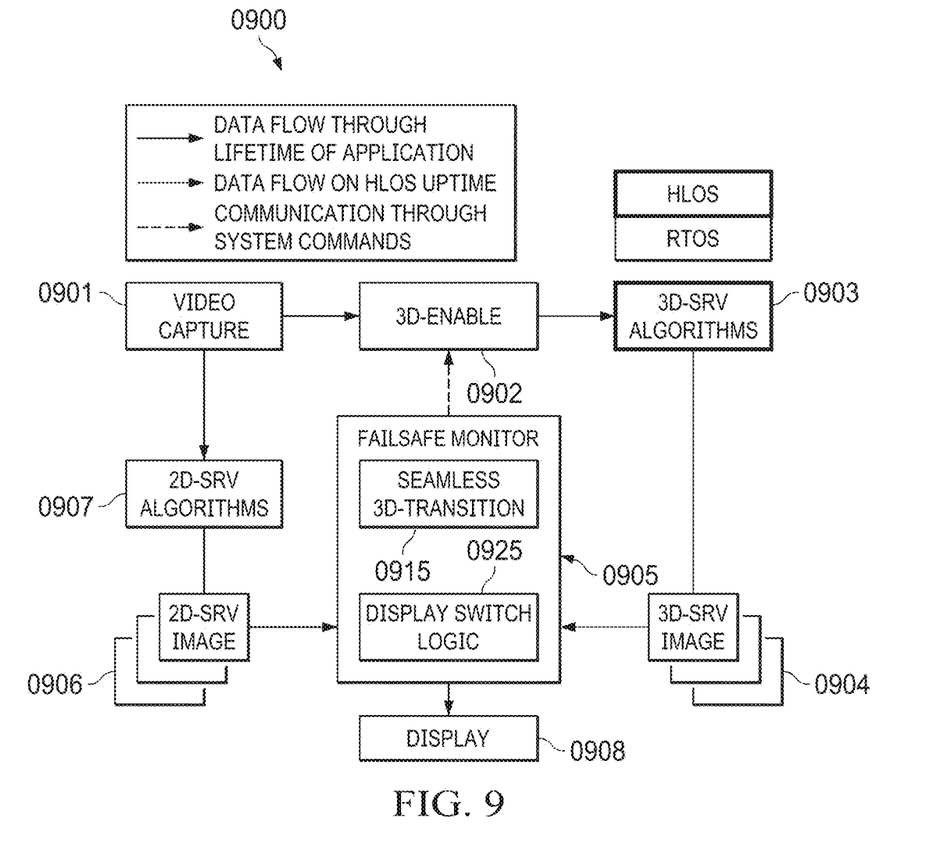
FIG. 9 depicts an exemplary block diagram of seamless transition from a 2D surround view display to a 3D surround view display according to one aspect of the present invention

FIG. 9 depicts an exemplary block diagram of seamless transition from a 2D surround view display to a 3D surround view display according to a preferred embodiment. Similar to FIG. 7 (0700), FIG. 9 (0900) comprises a failsafe monitor block (0905) that simultaneously receives 2D SRV images (0906) generated by a 2D SRV algorithm block (0907) and 3D SRV images (0904) generated by a 3D SRV algorithm block (0903). Input images or frames may be captured by a video capturing block (0901) and presented to both a 2D SRV algorithm block (0907) and a 3D SRV algorithm block (0903). The failsafe monitor (0905) further comprises a seamless transition block (0915) and a display switching block (0925). The seamless transition block (0915) enables the display to be switched from a default 2D SRV view to a 3D SRV view unless a failure is detected. The display switching block (0925) switches the display (0908) from 3D SRV view to 2D SRV view upon detection of a failure as described in FIG. 11. The failsafe monitor block may further generate a 3D enable signal to a 3D enable block (0902) to indicate the enabling or disabling the 3D processing engine. The 3D enable block may function as a gate to enable the flow of input frames from a video capture block (0901) to a 3D SRV algorithm block (0903). If the failsafe monitor detects an error in 3D processing, the 3D enable block may be disabled and block the flow of input frames to the 3D SRV algorithm block (0903).

Figure 10:
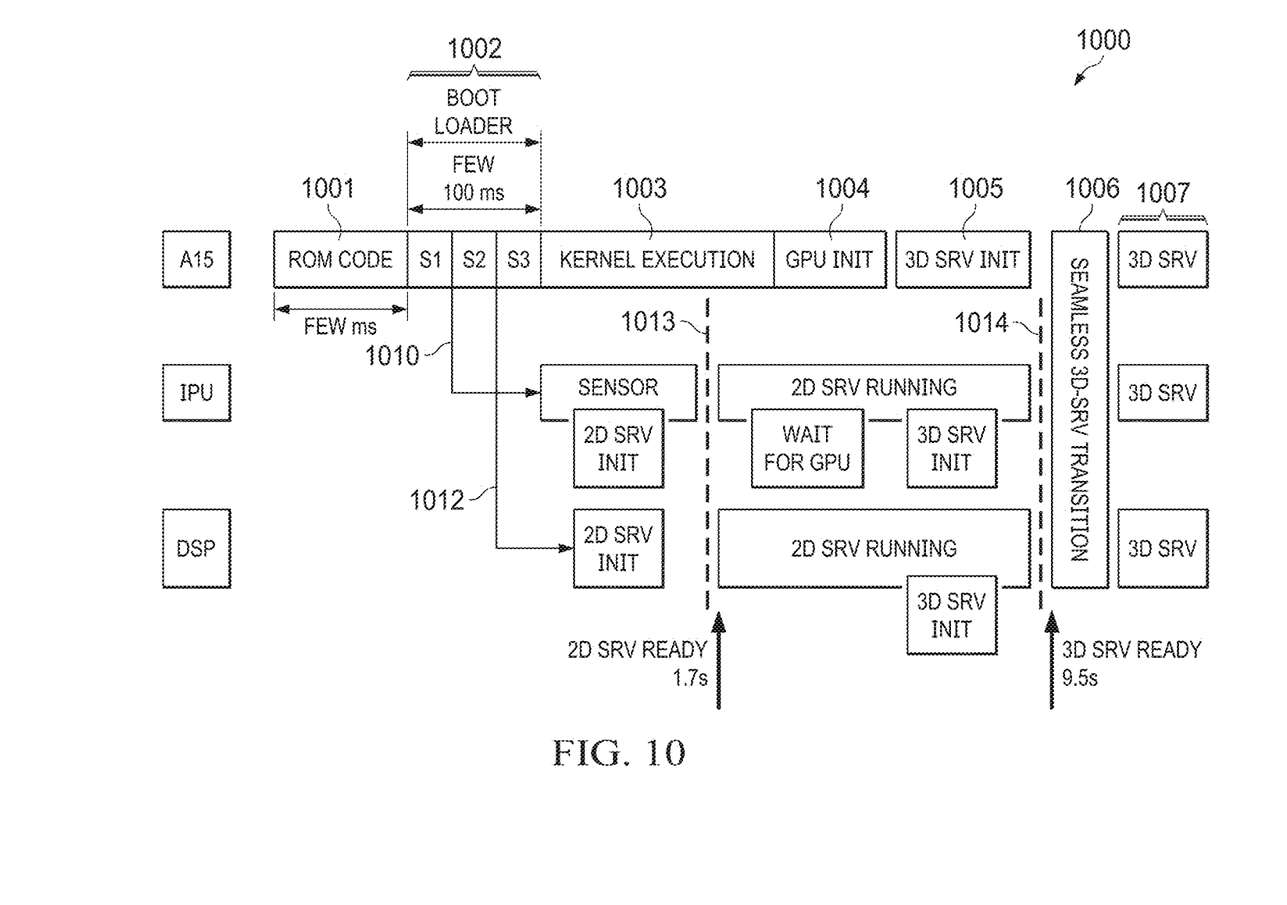
FIG. 10 illustrates an exemplary timing flow chart of seamless transition from a 2D surround view display to a 3D surround view display according to one aspect of the present invention.

FIG. 10 illustrates an exemplary timing flow chart of seamless transition from a 2D surround view display to a 3D surround view display according to a preferred embodiment. Upon power up, an embedded processer may boot first and run the boot rom from a rom code (1001) for a few milliseconds. A bootloader (1002) may then execute instructions from the boot rom in multiple stages, in one stage at time (1010) an auxiliary core may be initialized and in another stage at time (1012) the DSP algorithms are initialized to run 2D SRV. The 2D SRV engine may be initialized at time (1012) and ready at time (1013). The time to load bootloader may be 1-10 milliseconds on primary core, however booting, initialization of the firmware and subsequently running the application on the auxiliary cores can range from 300 milliseconds to 10 seconds depending on the type of sensor and number of cameras used. Subsequently, the 2D SRV processing engine is running and 2D SRV images are displayed on a display screen until the 3D SRV engine is initialized and running. The embedded processor may then load HLOS through a kernel (1003). In one example, the HLOS may be Linux OS and in other examples the HLOS may be Android or QNX. A GPU (1004) may be initialized during the kernel execution while the 2D SRV engine is running. The HLOS may wait for the GPU initialization to be complete and then perform a successful handshake to initialize a 3D SRV processing engine (1005). Upon completion of the 3D SRV processing engine initialization at time (1014), the display may be seamlessly switched over to the 3D SRV display through a seamless transition block (1006) which is similar to the block (0915). The 3D SRV display pipeline (1007) is enabled upon the seamless transition from 2D SRV view to a 3D SRV view. The bootloader is run on the primary core and loads the firmware on the auxiliary cores (as indicated in 1010 and 1012) and resets the clocks associated with these cores to enable initialization of firmware on the respective cores. Once the reset is triggered the bootloader jumps to loading the kernel (loaded in the primary core itself) and may not wait for the firmware to complete initialization on the auxiliary cores. This ensures that the firmware is loaded on auxiliary cores as soon as possible, ensuring applications which run independent of the HLOS can be serviced very quickly. Additionally, the bootloader can jump to kernel initialization quickly without having to wait for firmware initialization to be complete. Each core (primary and auxiliary) has a task running to keep check of the other cores status and establishes a communication mechanism with the core once the OS (RTOS/HLOS) running on the respective cores is ready. This communication mechanism helps establish a flow of buffers between the cores and also triggers events which facilitates switching between the SRV applications.

As generally seen in the flow chart of FIG. 11 (1100), a preferred exemplary failsafe detection method for transitioning from a 3D surround view display to a 2D surround view display upon detection of a failure may be generally described in terms of the following steps:

1. capturing a new frame and checking if 3D SRV processing enabled, if so proceeding to step (1102), if not, proceeding to step (1110) (1101);
2. checking if the new frame is a 3D type frame, if yes, proceeding to step (1103), if not, proceeding to step (1105) (1102);
3. resetting a lag counter (1103);
4. displaying the 3D frame in 3D SRV view (1104);
5. incrementing the lag counter by 1 (1105);
6. checking if the lag counter exceeds a threshold value, if so, proceeding to step (1108), if not, proceeding to step (1107) (1106);
7. dropping the frame gracefully (1107);
8. disabling 3D-SRV display pipeline and enabling 2D-SRV display pipeline (1108);
9. disabling 3D-SRV processing engine and initiating forceful buffer reclaim (1109); and
10. displaying 2D SRV view (1110).

Method Summary

The present invention method may be broadly generalized as a method for seamless transition from a 2D surround view to a 3D surround view, wherein the method comprising the steps of:
a) initializing the 2D-SRV processing chain;
b) displaying the 2D surround view while waiting for HLOS handshake to complete;
c) if HLOS handshake complete, initializing 3D-SRV processing chain, if not proceeding to step (b);
d) waiting for a 3D-SRV buffer output;
e) disabling 2D-SRV display pipeline and enabling 3D-SRV display pipeline;
f) enabling switchback monitor;
g) atomically switching to 3D surround view; and
h) displaying 3D surround view on a monitor.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:

One skilled in the art will recognize that other embodiments are possible based on combinations of elements taught within the above invention description.

An embodiment wherein the step of initializing further comprises booting from a boot loader and enabling 2D-SRV display pipeline.

An embodiment wherein a time for booting ranges from 1 millisecond to 10 milliseconds.

An embodiment wherein the step of displaying the 2D surround view further comprises the steps of:
a. capturing one or more input images with at least one optical device;
b. aligning and blending the input images;
c. stitching the images into one output image;
d. checking if 2D-SRV display pipeline is enabled; and
e. displaying the 2D surround view.

An embodiment wherein the step of waiting for HLOS handshake to complete further comprises the steps of:
a. initializing a GPU;
b. checking if HLOS is ready; and
c. checking if GPU is ready to render the 3D surround view.

An embodiment wherein the step of initializing 3D-SRV processing chain further comprises enabling communication mechanism between the auxiliary cores running RTOS and the primary core running HLOS.

An embodiment wherein the step of waiting for a 3D-SRV buffer output further comprises allowing capture buffers to flow to a GPU.

An embodiment wherein the 2D processing chain and the 3D processing chain are both running simultaneously in parallel.

An embodiment further comprises capturing input images through a view port and presenting the images to the 2D processing chain and the 3D processing chain concurrently.

An embodiment wherein a latency of atomically switching between the 2D surround view and the 3D surround view is substantially 0.

An embodiment wherein a latency of atomically switching between the 2D surround view and the 3D surround view ranges from 16 milliseconds to 500 milliseconds.

An embodiment wherein the step of atomically switching between the 2D surround view and the 3D surround view happens without loss of an input frame.

An embodiment further comprises a failsafe, the failsafe further comprises the steps of:
a. enabling a failsafe monitoring algorithm;
b. detecting a failure in the 3D surround view;
c. disabling 3D-SRV display pipeline and enabling 2D-SRV display pipeline;
d. disabling 3D processing chain and enabling forceful reclaim;
e. atomically switching to the 2D surround view; and
f. displaying the 2D surround view on a monitor.

An embodiment wherein the step of displaying the 3D surround view further comprises the steps of:
a. capturing one or more input images with at least one optical device;
b. processing through a GPU rendering block;
c. stitching the images into one output image;
d. checking if 3D-SRV display pipeline is enabled; and
e. displaying the 3D surround view.

We claim:
1. A method comprising:
initializing a 2D image processing chain;
prior to initializing a 3D image processing chain, displaying an output of the 2D image processing chain;
upon detecting a handshake by an operating system, initializing the 3D image processing chain; and
after initializing the 3D image processing chain:
receiving a set of images from a set of optical devices;
concurrently processing the set of images with the 2D image processing chain to produce a 2D surround view and processing the set of images with the 3D image processing chain to produce a 3D surround view; and displaying a view from a group consisting of the 2D surround view and the 3D surround view.

2. The method of claim 1 wherein the initializing of the 3D image processing chain includes:

initializing a graphical processing unit (GPU);

checking if the operating system has been initialized; and checking if the GPU is ready to render the 3D surround view.

3. The method of claim 1 wherein:

the operating system is a high-level operating system that runs on a primary core; and the initializing of the 3D image processing chain includes enabling a communication mechanism between a set of auxiliary cores running a real-time operating system and the primary core running the high-level operating system.

4. The method of claim 1 wherein the processing of the set of images with the 2D image processing chain includes:

aligning and blending the set of images; and stitching the set of images into one output image.

5. The method of claim 1 wherein the displaying of the view includes, upon detecting a failure of the 3D image processing chain, displaying the 2D surround view.

6. The method of claim 5, wherein the failure includes failing to receive the 3D surround view.

7. The method of claim 5 further comprising, upon detecting the failure of the 3D image processing chain, reclaiming a buffer used by the operating system.

8. The method of claim 1 wherein:

the operating system runs on a primary core; and the displaying of the view includes selecting, by an auxiliary core, between the 2D surround view and the 3D surround view.

9. A method comprising:

initializing a first processing chain;

receiving a first set of images of an environment from a plurality of optical devices;

processing the first set of images by the first processing chain to produce a first view of the environment;

the first view for display;

based on detecting a handshake by an operating system, initializing the second processing chain;

receiving a second set of images of the environment from the plurality of optical devices;

based on receiving the second set of images after the initializing of the second processing chain:

concurrently processing the second set of images by the first processing chain to produce a second view of the environment and processing the second set of images by the second processing chain to produce a third view of the environment;

selecting a view between the second view and the third view; and providing the selected view for display.

10. The method of claim 9 wherein the selecting of the view includes selecting the third view based on a failure by the second processing chain in the processing of the second set of images.

11. The method of claim 9 wherein the operating system runs on a first core and the selecting of the view is performed by a failsafe monitor running on a second core that is different from the first core.

12. The method of claim 9 wherein the processing of the first set of images by the first processing chain includes performing geometric alignment, photometric alignment, blending, and stitching of the first set of images to produce the first view.

13. The method of claim 9 wherein the processing of the second set of images by the second processing chain includes rendering and stitching of the second set of images to produce the third view.

14. The method of claim 9 wherein the first processing chain is a 2D image processing chain and the second processing chain is a 3D image processing chain.

15. The method of claim 9 wherein the initializing of the second processing chain includes:

initializing a graphical processing unit (GPU); and checking if the GPU is ready to render the third view.

16. A system comprising:

a channel capture block to receive a first set of images and a second set of images;

a first processing chain coupled to the channel capture block and operable to process the first set of images to produce a first view and to process the second set of images to produce a second view;

a second processing chain coupled to the channel capture block and operable to:

be initialized upon a handshake by an operating system; and after being initialized, process the second set of images to produce a third view;

a fail-safe monitor coupled to the first processing chain and the second processing chain and operable to:

receive the first view;

provide the first view based on the receiving of the first set of images being before the second processing chain is initialized;

receive the second view and the third view; and select between the second view and the third view to provide based on the receiving of the second set of images being after the second processing chain is initialized.

17. The system of claim 16 wherein the fail-safe monitor is operable to select the second view in response to detecting a failure of the second processing chain.

18. The system of claim 17 wherein the failure includes the second processing chain failing to produce the third view.

19. The system of claim 16 wherein the second processing chain includes a graphical processing unit to render the second set of images.

20. The system of claim 16 wherein the first processing chain is a 2D image processing chain and the second processing chain is a 3D image processing chain.

* * * * *